Feb. 4, 1969  D. R. ZELNICK  3,425,611
PLASTIC PACKAGING
Filed Sept. 30, 1966  Sheet 1 of 3
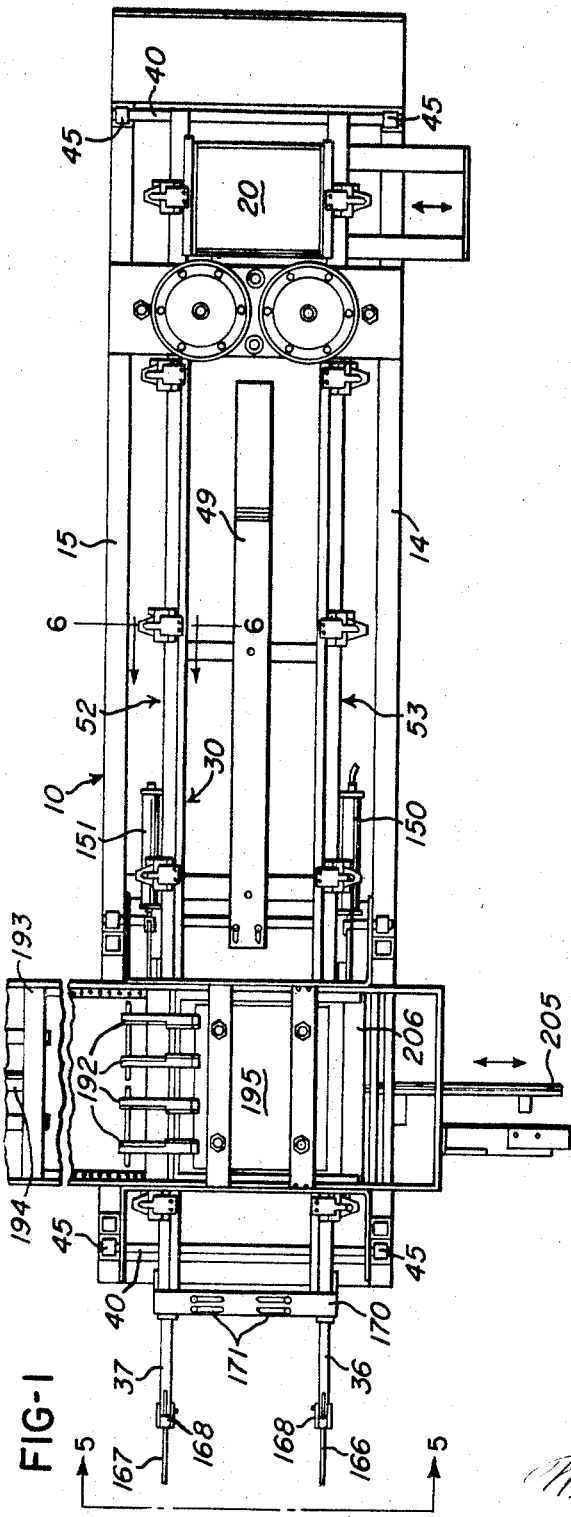
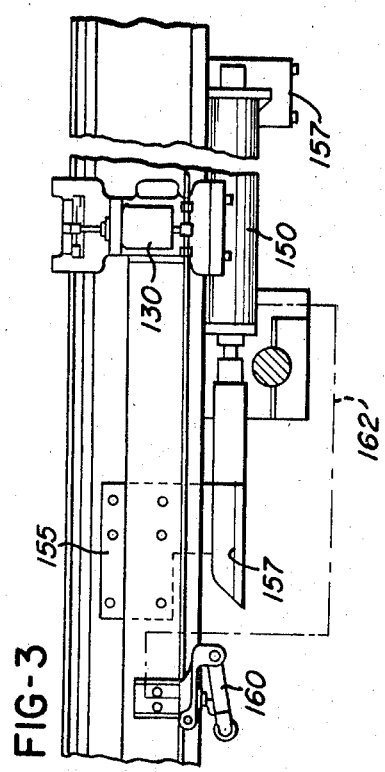
INVENTOR.
DAVID R. ZELNICK
BY
Marechal, Biebel, French & Bugg
ATTORNEYS

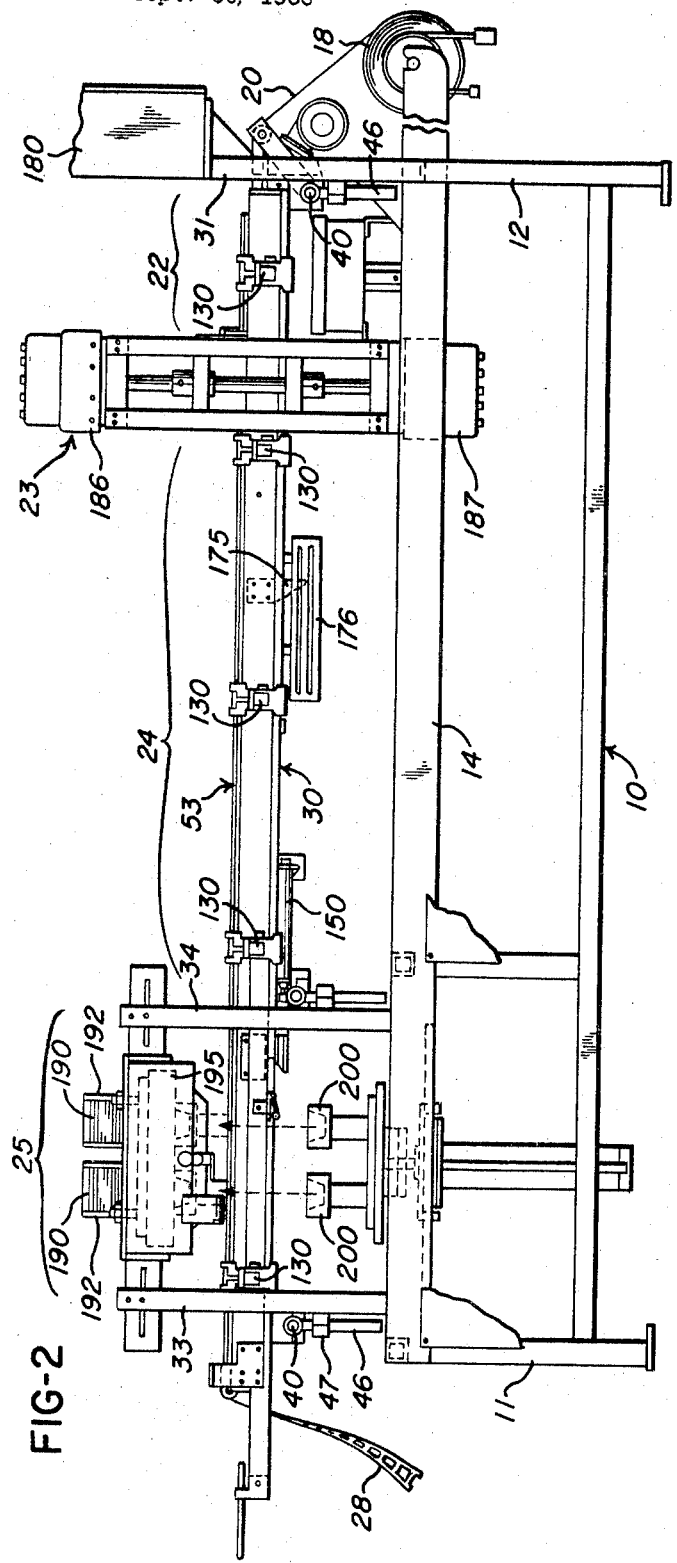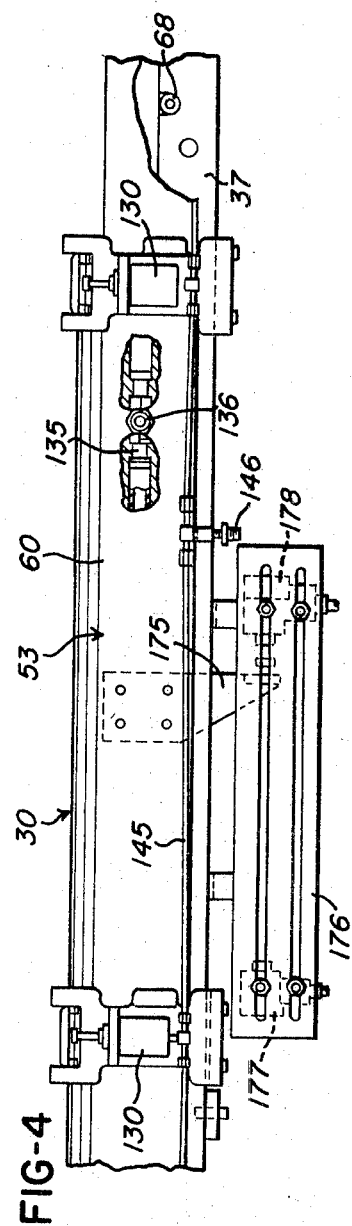

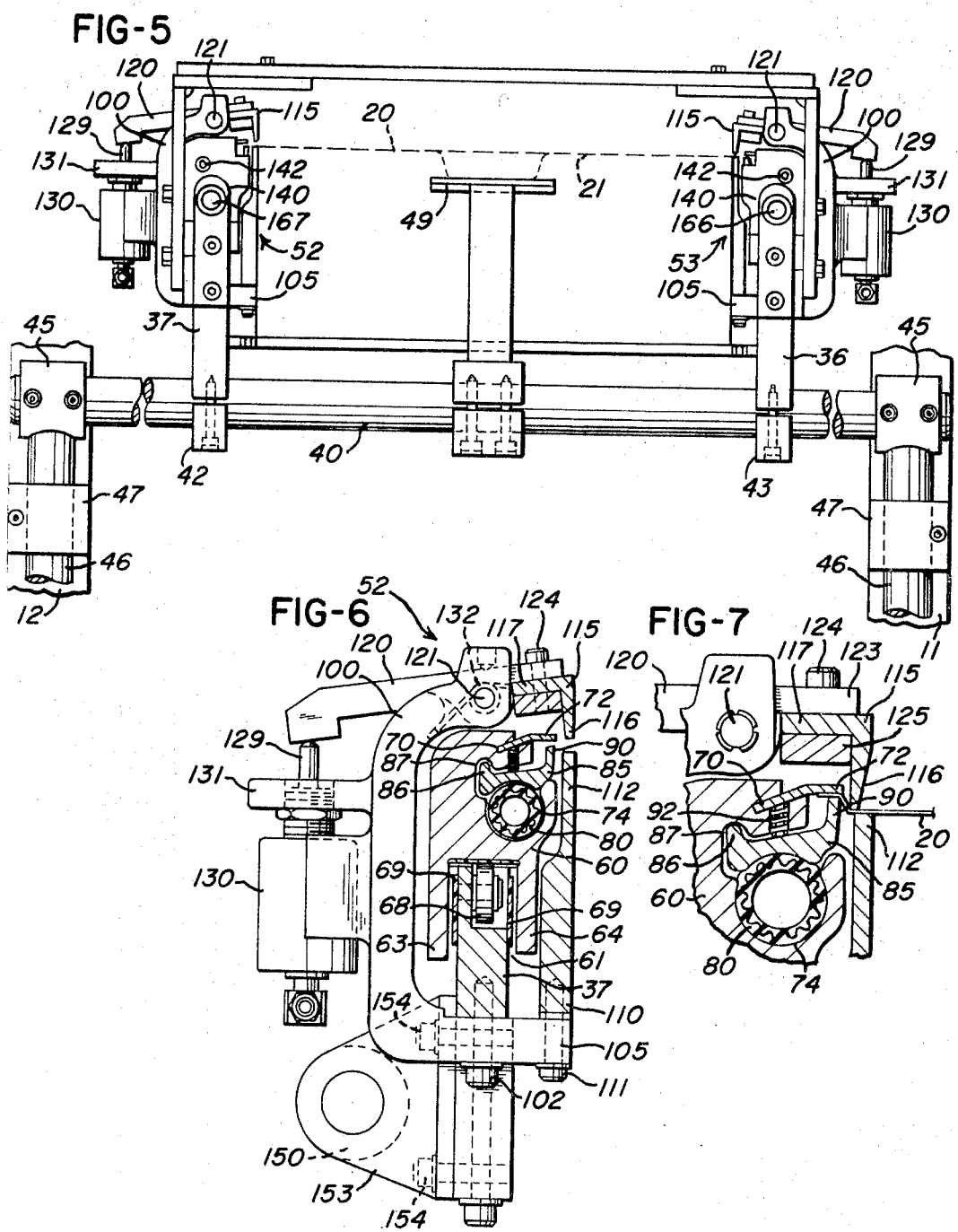

United States Patent Office 3,425,611
Patented Feb. 4, 1969

3,425,611
PLASTIC PACKAGING
David R. Zelnick, Dayton, Ohio, assignor to Koehler-Dayton, Inc., Montgomery County, Ohio, a corporation of Ohio
Filed Sept. 30, 1966, Ser. No. 583,292
U.S. Cl. 226—162
Int. Cl. B65h 17/20
10 Claims

ABSTRACT OF THE DISCLOSURE

A plastic film packaging machine and conveyor in which the strip of plastic film material is conveyed from a roll through a succession of modifying or shaping stations for preheating, forming, loading and then sealing, and in which a step-by-step conveyor grips the film along its edges. The conveyor includes a pneumatically-operated pair of gripping members which operate to advance the film and to secure the film in its advanced position longitudinally along its length, and a second pair of gripping members which do not move longitudinally but which grip the film strip inwardly of the first pair of gripping members for assisting in restraining the film during the forming operation, and for retaining during retracting movement of the conveyor grippers and which are arranged in non-interfering relation to the conveyor grippers.

---

This invention relates to packaging systems and more particularly to a packaging system in which plastic sheet material is modified or shaped and then applied to a backing sheet for containing and supporting articles of merchandise.

In packaging systems in which plastic sheet material is used as one of the packaging elements, it is common to draw a web of such material off of a roll in an intermittent conveying or feeding action through various stations for heating, pressure or vacuum forming, filling, and backing the sheet material. During these steps and operations, it is necessary to clamp the sheet material securely while it is being conveyed and while it is being acted upon at one or more of the several stations. It is particularly important that the conveying and clamping apparatus not impart extraneous stresses into the sheet material which would cause it to track unevenly, to wrinkle or buckle. It is further important that the sheet, during the forming, filling or cutting operations, be securely clamped against relative movement.

The above outlined objects are accomplished in this invention by the provision of a combined conveyor and clamp in which the longitudinal edges of the sheet material are firmly gripped by the conveyor during both the advancing and forming operations. A conveyor is provided which includes as its motivating clamping motor an elongated, expansible fluid-operated actuator which preferably extends substantially the entire length of the conveyor. Preferably, a hollow elastomeric tube is employed into which air pressure is applied. The expansion of the tube is utilized to effect gripping of a horizontal edge of the sheet material with a substantially uniform gripping force throughout the length of the clamp.

The conveyor and clamp of this invention is characterized by its reliability, and by its compactness so that the parts may be fitted in close proximity to the sheet heating, forming and severing apparatus without interference. The conveyor and clamp thus constructed may similarly be made with a low profile so that the clamp forms part of the sheet conveyor and can move longitudinally of a bed and track assembly with a minimum of interference with other components.

It is accordingly an important object of this invention to provide a combined clamp and conveyor system for advancing sheet material and for clamping the sheet material along substantially extending longitudinal edges with uniform forces distributed along these edges.

A further object of this invention is to provide a conveyor and clamp arrangement which is compact and lightweight permitting rapid movement of the parts with a minimum of inertia to be overcome on start-stop sequences.

A still further object of this invention is the provision of an improved plastic forming and packaging system in which a fluid-operated, expandible operator is employed to effect alternate clamping and releasing of the longitudinal edges of a web of plastic sheet material for advancing the same through the machine and for clamping the same during the several operations on the sheet material.

These and other objects and advantages of the invention will be apparent from the following description, the accompanying drawings and the appended claims.

In the drawings—

FIG. 1 is a partially broken away plan view of a packaging system having a conveyor constructed according to this invention;

FIG. 2 is a partially broken away elevational view of the packaging system of FIG. 1;

FIG. 3 is an enlarged elevational detail of a portion of FIG. 2 showing one of the air cylinders for moving the conveyor;

FIG. 4 is another enlarged elevational detail of a portion of the conveyor system of FIG. 2 showing the limit switch arrangement;

FIG. 5 is an enlarged view looking at one end of the conveyor system generally as indicated by the line 5—5 of FIG. 1;

FIG. 6 is an enlarged vertical section through one side of the conveyor taken generally along the lines 6—6 of FIG. 1; and FIG. 7 is a fragmentary view showing the elongated position of the parts of FIG. 6.

Referring to the figures of the drawing which illustrate a preferred embodiment of the invention, a packaging system is illustrated in FIGS. 1 and 2 which incorporates the improved conveyor system of this invention. The packaging system illustrated is of the pressure-forming type in which a sheet of thermoplastic material is deformed and is applied to a backing card to encapsulate articles which are to be merchandised. The packaging machine includes an elongated frame 10 having pairs of floor engaging legs 11 and 12 positioned at the opposite ends thereof for supporting the mechanism in raised relation to the floor so that the plastic material moves through the machine generally at waist level. The frame is formed with a pair of longitudinally extending rail-like support members 14 and 15 which are positioned at an intermediate height and which extend from the front legs 12 longitudinally beyond the rear legs 11 to project a short distance rearwardly of the machine. The rearwardly extending portions 16 of the rails 14 and 15 provide the means for rotatably supporting a roll 18 of plastic packaging material. A web 20 of such material is shown as being drawn off the roll 18 and into the machine along a form line 21 (FIG. 5).

The packaging machine as illustrated herein is made up of a plurality of stations at which the various steps take place in the manufacture of the completed package. The first station illustrated generally at 22 is a pre-heating station at which a portion of the web 20 is softened. The web then moves to a forming station 23 at which one or more packaging components, such as containers or trays, are formed within the sheet material. These parts may be formed at the forming station by differential air pressure, such as by drawing the portion of the softened web 20 over a perforated male die while sealing the same peripherally. These parts may be partially severed at the forming station during forming, or they may be trimmed at a subsequent station. Also, on some machines, the formed parts are retained in the web and are sealed to roll stock and then trimmed into individual containers, with the parts and cover material being trimmed to the same size.

These pressure or vaccum formed packaging components, which may be partially severed, continue to move with the web 20 to a loading area indicated generally at 24 at which an operator places the loose articles in the blisters for packaging.

The web 20 continues including the partially-separated blisters and articles to a sealing station 25 at which the blisters are severed from the web 20 and are heat sealed to a backing card, and ejected from the machine as a finished package. The web scrap 28, with the blisters or packaging components removed, feeds off the end of the machine for disposal.

It is important in the operation of a pressure forming and sealing machine of the general type disclosed above that the sheet material comprising the web 20 be conveyed uniformly through the length of the machine without binding or twisting. It is also important that the entire length of the sheet material within the machine from the pre-heating station 22 to the sealing station 25 be firmly gripped along the opposite longitudinal edges during the combined pre-heating, forming, loading and sealing stages. Preferably, each of these actions take place substantially simultaneously while the web 20 is stopped and is tightly gripped in place. Thereafter, the conveyor system of this invention operates to move to a retracted position, where it again grips the longitudinal edges of the web and causes the same to advance by a predetermined amount within the machine sufficient to bring the preheated stock material into the forming station and to align accurately the preformed and partially severed blisters in the sealing station.

It is also important that the web be gripped at all times during the cycle of operation. For this purpose, the conveyor apparatus is provided with two sets of gripper members. One set is movable and comprises the conveyor proper while the other set is relatively fixed so that the web may be clamped and secured during the return movement of the first set of gripping members.

The conveyor apparatus is illustrated generally at 30 in FIGS. 1 and 2 and is supported in elevated relation to the frame rails 14 and 15. At the rear of the machine, the conveyor 30 is supported on a pair of upwardly extending frame members 31 which may conveniently be formed as integral extensions of the legs 11. At the front of the machine, the conveyor 30 is supported on upright pairs 33 and 34 (FIG. 1) which have their lower ends resting on and welded to the rails 14 and 15.

The conveyor 30 includes a pair of parallel, spaced-apart rails or tracks 36 and 37 which extend from a position above and adjacent the heating station 22 at the entrance or rear end of the machine to positions adjacent the outlet end of the machine at the sealing station 25. The rails 36 and 37 are rectangular in section, and are supported at each of the upright pairs 31, 33 and 34 on transversely aligned tubes 40. Split cinch blocks 42 and 43 (FIG. 5) are clamped on the tube 40 and have their upper ends secured to the respective rails 36 and 37. By loosening the blocks 42 and 43, the spaced apart width of the rails may be adjusted for accommodating webs 20 of different widths in the conveyor 30.

The transverse support tubes 40 have their opposite ends received in couplings 45 which are, in turn, joined with downwardly depending tubular members 46. The members 46 are received in cinch blocks 47 securely fastened to one face of the upright frame supports 31, 33 and 34, and provide the means by which height and alignment of the conveyor 30 may be adjusted and maintained. Also supported on the transverse tubes 40 is a support bed 49 (FIGS. 1 and 5) which is positioned somewhat below the form line 21 of the web 20 at the loading section 24 for partially supporting the weight of the blisters and assembled articles as they move through this station.

Associated with each of the rails 36 and 37 are essentially identical right and left gripper or clamp assemblies 52 and 53 for gripping the opposite longitudinal edges of the plastic material. The detailed description of the clamp assemblies is made herein with specific reference to the assembly 52, FIGS. 6 and 7, it being understood that the opposite assembly 53 is essentially the same in construction and operation.

The clamp assembly 52 includes an inner clamp and an outer clamp. The inner clamp is formed with a longitudinally extending rail-like clamp member or body 60 which is formed with a downwardly opening channel 61 received over the rail 37. Thus, the body 60 is mounted for longitudinal movement on the rail 37, and is guided by the depending flanges 63 and 64 received along opposite sides of the rail. For this purpose, the rail may be provided with a plurality of recessed rollers 68 which support the bottom of the body 60 in slightly raised relation to the rail 37. In addition, low friction polytetrafluoroethylene pads 69 may be provided along either side of the rail 37 to provide guiding alignment for the body 60.

The clamp body 60 accordingly extends substantially the full length of the packaging machine along the rail 37, while it is mounted for longitudinal movement along the rail. It includes first clamp means in the form of a stainless steel, longitudinally extending leaf 70 which has its inner end rigidly received within the body 60 and it has a transversely extending clamping lip 72. The leaf 70 extends along the full length of the body.

The body 60 is formed with a longitudinally extending, semicircular recess 74 for receiving an elastometric expansible tube 80 therein. The tube 80 is peripherally reinforced with a woven fabric to provide a controlled stretch and to prevent the tube from splitting if it should become over-inflated. It extends substantially the length of the body 60. A second clamping member 85 also extends the length of the body 60 and is positioned in supporting relation on the tube 80. It has an inner, upwardly extending projection 86 pivotally received within an arcuate recess 87 formed in the body 60. A forward end of the second clamp member 85 is turned upwardly and defines with the leaf 70 a lower clamping jaw 90. A plurality of compression springs 92 are positioned between the upper surface of the second clamp member 85 and the leaves 70 and normally urge apart the jaw 90 and the lip 72.

The elastomeric tube 80 comprises fluid expandable means positioned between the body 60 and the clamp member 85 along the length of the base 60. The tube 80 is operated by the application of fluid pressure thereto, such as air under pressure, to apply a substantially uniformly distributed force against the second clamp member 85 causing it to move into closing relation with the leaf 70, with substantially uniform force throughout the full length of the inner clamp, as shown in FIG. 7. This results in the gripping of the opposite longitudinal edges of the web with a uniform gripping force along its length so that, upon movement of the bodies on the tracks or rails 36 and 37, the web will be moved uniformly along the length of the conveyor 30.

Each assembly 52 and 53 of the conveyor further includes outer clamping means for engaging the web of plastic material to prevent its movement during the release and return movement of the inner clamp. This comprises a plurality of longitudinally spaced apart fixed C-shaped clamp bodies 100 having their lower ends secured firmly against the bottoms of the rails 36 and 37 by bolts 102, while compactly and partially encircling the outer sides of the bodies 60. The outer clamp members 100 are formed with inwardly or transversely extending base legs 105 which support on their upper surfaces a continuous, plate-like lower clamp 110, retained in place by bolts 111. The clamp 110 as shown in FIG. 6 is positioned inside and generally parallel to the rail 37 and the body 60, and forms at its upper end a longitudinal extending, secondary clamping surface 112 positioned inwardly and offset somewhat downwardly in relation to the inner clamping surface defined by the leaf 70.

The outer clamp further includes an L-shaped upper clamping member 115 which is coterminous with the lower clamp 110 and formed with a generally downwardly extending flange 116 and a transversely extending flange 117. The member 115 is mounted for rocking movement between open and closed positions on the clamp members 100 by means of individual levers 120 which are pivotally mounted on pins 121 at the upper ends of the individual clamp members 100. The levers have forward ends 123 secured to the upper surface of the flange 117 by bolts 124 threaded into short blocks 125 received under the clamp member 115. The rockable levers 120 extend rearwardly of the pivot pins 121 and normally engage the pin 129 of an air cylinder 130. The cylinders 130 provide the means for operating the outer clamp members, and are threaded into supporting projections 131 on the bodies 100. The outer clamp member is urged toward a retracted or open position, as shown in FIG. 6, by a torsion spring 132 around the pin 121.

Referring to FIG. 7, which shows the inner and outer clamp members in their operating positions engaging the longitudinal edge of a web 20, it will be seen that the plane of sheet engagement defined by the outer clamp members 110 and 115 is offset downwardly from the corresponding plane defined by the inner clamping members 70 and 85. Preferably, during the forming steps, both the inner and outer clamp members of each conveyor section 52 and 53 are operated providing a double clamp at the longitudinal edges of the sheet, and inducing a Z-shaped configuration in the plastic sheet along the length of the edges. This induces a controlled amount of transverse tension in the web. Additionally, the double, offset clamp provides an efficient gripping action on the plastic material preventing pulling out or movement during the forming operations. Also, when either of the inner or outer clamps is open, the sheet of plastic material may pass freely through the opening defined by the clamping parts, such as occurs when the sheet is being advanced by the inner clamp or is being held by the outer clamp during retraction or return movement of the conveyor.

The connection means through which air under pressure is applied to the expansible tube 80 of each conveyor assembly 52 and 53 may be seen by reference to FIG. 4 where a portion of the body 60 is broken away to expose a T-shaped fitting 135 having its forward end 136 extending laterally through the body 60 and its opposite ends extending into the tube 80 which is split at the region of the T-fitting for this purpose. It is understood that a flexible air line is connected to the end 136 of the T-fitting 135, not shown. The opposite ends of the tubes 80 are suitably blocked or closed, such as by end plates 140 (FIG. 5) formed at the ends of the body 60 and secured by a screw 142. Alternately, the air line may be connected at one end of the conveyor, eliminating the need for a T-fitting inserted within the body 60. The air cylinders 130 associated with the outer clamp members are connected in common to an air line 145 which is supplied by a T-fitting 146, also shown in FIG. 4.

Means for moving the conveyor 30 in advancing and retracting movements include a pair of air cylinders 150 and 151 (FIG. 1). The air cylinder 150 is shown in enlarged detail in FIG. 3 and has one end secured to the rail 37 by a mounting bracket 153. The bracket 153 is shown in elevation in FIG. 6 as being mounted to the bottom of the rail 37 by pairs of bolts 154. The air cylinders 150 and 151 extend parallel to the associated rails and have operative connections to the respective bodies 60 in the form of plates 155 (FIG. 3) bolted thereto. The lower ends of at least one of the plates 155 is formed with a cam surface 157 which, during a portion of the stroke of the cylinder 150, engages an air valve 160. The valve 160 is effectively connected to the forward end of the cylinder 150 through a line 162 and, for a portion of the stroke of the cylinder, blocks or closes off the escape of air from the front of the cylinder 150, thereby cushioning the movement of the conveyor 30 toward its limit position after which the valve opens.

The limit position of the conveyor is defined by means of a pair of threaded rods 166 and 167 mounted on the ends of the rails 36 and 37 and adjustably supported in brackets 168 (FIG. 1 and 2). The rearwardly directed ends of the rods 166 and 167 come into abutment with the end plates 140 formed on the ends of the conveyor body 60 to define the advanced position of the conveyor. Parallelism in the movement of the conveyor is assured by a cross-over brace 170 (FIGS. 1 and 5) which is slotted at 171 for transverse adjustment in width, and which is rigidly bolted to the outer sides of the bodies 60.

Means for signaling the fact that the conveyor 30 has moved either to its forward or reverse positions, includes a downwardly depending plate 175 (FIG. 4) attached to the body 60 of the assembly 52 and cooperating with a slotted plate 176 upon which suitable limit switches 177 and 178 may be adjustably mounted. The electric and pneumatic controls are contained in a control box 180 (FIG. 2) mounted on the supports 31 at the inlet end of the machine.

In the operation of the forming machine, the roll 18 of plastic sheet material is threaded with the web 20 received over a guide roller 185 at the inlet end of the machine and threaded through the conveyor assemblies 52 and 53. When a cycle of operation is initiated, the preheater 22 heats a portion of the web 20 and the same is advanced by the operation of the conveyor cylinders 150 and 151 to a position in which the conveyor assemblies 52 and 53 are in abutment with the limit rods 166 and 167. The upper and lower pairs of forming pistons 186 and 187 of the forming station 23 operate in the known manner to form blisters within the web material. During forming, both the inner and outer clamp members are closed upon the web in the manner illustrated in FIG. 7. Thereafter, the air pressure to the tube 80 is removed, and the bodies 60 of the conveyor and the associated inner clamp mechanisms are retracted while the outer clamp members 110 and 115 remain closed. The retracted position is signaled by the switch 178 which activates a further extending movement of the pistons 150 and 151 after first opening the outer clamps, conveying the web 20 uniformly forward through the machine.

At the sealing section 25, a plurality of backing cards 190 are supported in stacked relation between pairs of guides 192. A pneumatically operated card feeding device includes a pusher 193 which is operated by a cylinder 194 to position individual backing cards 190 at the bottom heated surface of a heating plate 195.

The sealing section 25 also includes a plurality of mandrels 200 which are positioned below the sheet material and which are movable upwardly by an air cylinder 202 to remove the partially severed blisters from the web 20 and carry them upwardly into engagement with the positioned cards 190, as shown by the broken lines in FIG. 2, where a seal between the blister and the card is formed by the application of heat through the card from the plate 195. Thereafter, the mandrels 200 retract and the finished packages are ejected by an ejection cylinder 205 and a package ejector member 206 (FIG. 1).

The severing or removing and sealing steps which take place at the sealing station 25 are performed simultaneously with the operation of the forming station 23, and during this time the web 20 is securely and uniformly retained by the inner and outer clamp members of the conveyor 30, as previously described.

It is therefore seen that this invention provides a conveyor system for a plastic forming and packaging machine which is simple in operation and which provides both uniform and unfailing gripping of the lateral edges of a web of plastic sheet material during the various forming steps. It is compact and accordingly occupies a minimum of transverse space where space is critical, such as at the forming and sealing stations. The double gripping action provided by the simultaneous operation of the inner and outer clamp members effects a transverse tensioning in the web, and the pressure responsive actuator tube 80 provides a uniform gripping force when the web is being conveyed to an advanced position.

The moving parts of each of the inner and outer clamps are also relatively light in weight. This provides for fast clamping action with a minimum of inertia so that the time of the overall cycle of operation may be reduced or determined by the times required by the various stations, with a minimum of time required for clamping, conveying, and releasing.

While the form of apparatus herein described constitutes a preferred embodiment of the invention, it is to be understood that the invention is not limited to this precise form of apparatus, and that changes may be made therein.

What is claimed is:

1. In a plastic forming and packaging machine, the improvement in a plastic material conveyor in which plastic sheet material is advanced by a reciprocating conveyor mechanism through a series of stations and restrained in its advanced position for forming, filling, sealing or severing, and in which the conveyor mechanism returns to a starting position for a further advance of the material, the improvement in such conveyor mechanism comprising a pair of generally parallel spaced-apart tracks extending on said machine past said stations, each said track having a first clamp member movable longitudinally on said track and having an elongated material-engaging portion, a second clamp member mounted for movement on said first clamp member, said second clamp member having a correspondingly elongated material-engaging portion opposed to the corresponding said portion of said first clamp member and adapted to receive the edge of such sheet material therebetween for gripping such material along said stations, longitudinally extending fluid expansible means positioned between said first and second clamp members and being operable upon the application of fluid pressure thereto to apply longitudinally thereof a substantially uniformly distributed force against at least one of said clamp members to urge said material engaging portions together into clamping engagement with the edge of the sheet material providing a substantially uniform restraining force to said material for conveying and gripping said sheet material, and means for reciprocating said conveyor mechanism.

2. A plastic forming machine in which plastic sheet material is advanced in step-by-step manner through a succession of working stations for physical modification of the sheet material, filling and sealing thereof, comprising a pair of spaced apart rails extending past said stations, a pair of first clamp assemblies mounted one on each of said rails, each of said assemblies having upper and lower longitudinally extending clamp members for engaging an edge of such sheet material along its length at said stations, means for actuating said clamp members into engaging relation to said sheet material edge, means for moving said first clamp assembly longitudinally of said rails for advancing such sheet material through said stations, a pair of second clamp assemblies one for each of said rails and mounted in longitudinally fixed relation to said rails, said second assemblies each having an upper and a lower clamp member positioned transversely inwardly of the clamp members of said first clamp assemblies longitudinally of said rails in non-interfering relation to said first clamp assemblies, and means for actuating said second clamp assemblies independently of said first clamp assemblies.

3. The machine of claim 2 in which said clamp members of said second clamp assemblies engage such sheet material in a plane offset from that of said first clamp assemblies for stretching the plastic material transversely of said rails during forming.

4. The machine of claim 2 wherein said second clamp assemblies include a plurality of longitudinally spaced, generally C-shaped supports formed in generally encircling relation to said first clamp members and connecting said second clamp assemblies upper and lower clamp members and defining an opening through which said first clamp assemblies are free to move.

5. The conveyor assembly of claim 1 further including fixed clamp means associated with each of said tracks for engaging said sheet of material to prevent its movement during the return movement of said reciprocating conveyor mechanism, said fixed clamp means comprising, an outer clamp body fixed to said track, a third clamp member mounted on and extending upwardly from said outer body and having a sheet engaging portion extending longitudinally adjacent said second clamp member, a fourth clamp member pivotally mounted on said outer body having a sheet engaging portion arranged opposite the sheet engaging portion of said third calmp member, spring bias means connected to said outer body and said fourth clamp member to normally urge the sheet engaging portion of said fourth clamp member out of engagement with said third clamp member, and an actuating means mounted on said outer body and operable connected to said fourth clamp member for moving said sheet engaging portion of the fourth clamp member toward said third clamp member and into engagement with said sheet of material.

6. The conveyor assembly of claim 1 further comprising a fixed clamp means for engaging said sheet of material to prevent its movement during return movement of said conveyor mechanism.

7. The conveyor assembly of claim 6 in which said fixed clamp means comprises, a third clamp member for each said track fixed with respect to said track and having a sheet engaging portion extending longitudinally adjacent said second clamp member, a fourth clamp member movably mounted on said third clamp member and having a sheet engaging portion positioned opposite to and engageable with the sheet engaging portion of said third clamp member, and means for urging the fourth clamp member toward said third clamp member and into engagement with said sheet.

8. In a plastic forming and packaging machine in which plastic sheet material is conveyed through a succession of stations for modification or treatment, the improvement in a plastic sheet conveyor comprising a pair of conveyor assemblies spaced apart along the machine and extending alongside of said stations, each said conveyor assembly comprising a track rail, a body slidably mounted on said rail for reciprocal movement, a first longititudinally elongated clamp member on said body and having a clamping surface engageable with a longitudinal edge of such sheet material in said conveyor at said stations, a second clamp member movably mounted on said body and having a length longitudinally of said assembly generally coterminous with said first clamp member and having a clamping surface engageable with said sheet material at said first clamp member, and an elongated elastomeric tube received between said body and said second clamp member and being expandable upon the application of fluid pressure thereto to move said second clamp member into clamping engagement with said first clamp member.

9. The machine of claim 8 in which said first and second clamp members comprise an inner clamp, said conveyor assemblies each further comprise an outer clamp including an additional pair of longitudinally elongated clamping members, means mounting one of said additional clamping members in fixed relation to said rail, means mounting the other of said additional clamping members for clamping movement with respect to said one clamping member, and each of said additional members being proportioned to engage said sheet material at a position transversely inwardly of said inner clamp along a plane which is offset from the clamping plane of said inner clamp providing a Z-shaped configuration of the plastic material extending between said inner and outer clamps, and motor means independent of said inner clamp for actuating the said clamping members of said outer clamp.

10. The machine of claim 8 in which said tube is formed substantially with an effective length corresponding to the length of said clamp members providing a uniform clamping force along the length of said clamp members.

References Cited

UNITED STATES PATENTS

| | | | |
|---|---|---|---|
| 2,755,085 | 7/1956 | Giani | 226—162 |
| 3,123,270 | 3/1964 | Olson | 226—162 |
| 3,140,032 | 7/1964 | Heath | 226—162 |

EVON C. BLUNK, *Primary Examiner.*

H. C. HORNSBY, *Assistant Examiner.*